United States Patent
Cohen et al.

(10) Patent No.: US 10,049,414 B2
(45) Date of Patent: Aug. 14, 2018

(54) AUTOMATED MEDIA RIGHTS DETECTION

(75) Inventors: Gabriel Cohen, San Mateo, CA (US); Bethwyn Morris, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 2023 days.

(21) Appl. No.: 12/113,678

(22) Filed: May 1, 2008

(65) Prior Publication Data

US 2017/0061557 A1    Mar. 2, 2017

(51) Int. Cl.
| | |
|---|---|
| *G06F 21/00* | (2013.01) |
| *G06Q 50/18* | (2012.01) |
| *G06F 21/10* | (2013.01) |
| *H04L 29/06* | (2006.01) |
| *G06F 17/30* | (2006.01) |
| *H04N 21/435* | (2011.01) |

(52) U.S. Cl.
CPC ............ *G06Q 50/18* (2013.01); *G06F 21/10* (2013.01); *G06F 17/30743* (2013.01); *G06F 17/30752* (2013.01); *H04L 63/10* (2013.01); *H04L 2209/60* (2013.01); *H04N 21/435* (2013.01)

(58) Field of Classification Search
CPC ............... G06F 21/10; G06F 17/30743; G06F 17/30752; H04L 63/10; H04L 2209/60; H04N 21/435; G06Q 50/18
USPC .......... 726/1, 4, 17, 21, 26, 28–33; 380/201, 380/229; 713/176, 180; 705/51; 707/3
See application file for complete search history.

(56) References Cited

U.S. PATENT DOCUMENTS

| | | | |
|---|---|---|---|
| 7,085,741 B2 * | 8/2006 | Lao et al. ................ | 705/51 |
| 7,239,873 B2 * | 7/2007 | Kawashima et al. ...... | 455/435.1 |
| 7,363,277 B1 * | 4/2008 | Dutta et al. ............... | 705/57 |
| 7,565,327 B2 * | 7/2009 | Schmelzer ................ | 705/67 |
| 2002/0120586 A1 * | 8/2002 | Masaki et al. ............. | 705/75 |
| 2002/0157012 A1 * | 10/2002 | Inokuchi ................ | G06F 21/10 |
| | | | 713/193 |

(Continued)

OTHER PUBLICATIONS

Hossein Bidgoli, The Internet Encyclopedia, vol. 2, 2004, John Wiley and Sons, p. 42, Fig. 6.*

(Continued)

*Primary Examiner* — Carl G Colin
*Assistant Examiner* — Gary E Lavelle
(74) *Attorney, Agent, or Firm* — Young Basile Hanlon & MacFarlane, P.C.

(57) ABSTRACT

Systems and methods for determining if media files being submitted to a hosting site contain media to which another has rights and informing a submitter of the potential media rights conflict without first divulging such information to a potential third party rights holder. Upon submission, if the media contains material to which another has rights, the submitter will be informed which portion of the submitted media file is infringing and given the opportunity to submit a modified media file. This approach maintains the confidential nature of the submitted media while enforcing the rights of third parties. The system also automatically notifies the appropriate parties in the event that the submitter does not resolve a conflict with media files to which another has rights and includes the ability to automatically remove the offending submitted media content. A method for detecting a possible media rights conflict is also presented.

6 Claims, 3 Drawing Sheets

(56) References Cited

U.S. PATENT DOCUMENTS

| | | | |
|---|---|---|---|
| 2005/0091537 A1* | 4/2005 | Nisbet et al. | 713/201 |
| 2006/0010073 A1* | 1/2006 | Fisher et al. | 705/51 |
| 2007/0180258 A1* | 8/2007 | Broussard et al. | 713/182 |
| 2007/0220614 A1* | 9/2007 | Ellis | G06F 21/6245 726/27 |
| 2008/0155701 A1* | 6/2008 | Martinez et al. | 726/27 |
| 2008/0178302 A1* | 7/2008 | Brock et al. | 726/32 |
| 2008/0228733 A1* | 9/2008 | Davis et al. | 707/3 |
| 2009/0249491 A1* | 10/2009 | Miura et al. | 726/26 |
| 2009/0254572 A1* | 10/2009 | Redlich et al. | 707/10 |

OTHER PUBLICATIONS

Thomasnet, Autonomy's Virage Automates Copyright Infringement Detection for Online Video, Autonomy Corporation plc, Apr. 17, 2007, downloaded from http://news.thomasnet.com/fullstory/Software-automates-copyright-infringement-detection-802684?nomobile=1 on Jan. 29, 2014.*

Foremski, Autonomy CEO says tags don't work, Apr. 6, 2007, downloaded from http://www.siliconvalleywatcher.com/mt/archives/2007/04/autonomy_ceo_sa.php on Jan. 29, 2014.* tech2_admin, Autonomy Opens New Front in War on Piracy, Apr. 5, 2007, Tech2, downloaded from http://tech.firstpost.com/news-analysis/autonomy-opens-new-front-in-war-on-piracy-4491.html on Jan. 29, 2014.*

Hachman, M., "Meet 'Johnny,' The MPAA's New Tool To Fight Piracy," *ExtremeTech*, downloaded from http://www.extremetech.com/article2/0,1558,1992565,00.asp?kc=ETRSS02129TX1K0000532, published on Jul. 21, 2006.

Rosenblatt, B., "Sony Music Gets Fingerprinted," *DRM Watch*, downloaded from http://www.drmwatch.com/drmtech/article.php/3363151, published on Jun. 3, 2004.

\* cited by examiner

AUTOMATED MEDIA RIGHTS DETECTION

BACKGROUND

Field of the Invention

The present invention relates to detecting possibly conflicting media rights.

Related Art

The popularity of sharing, distributing, and posting electronic media on the Internet has increased dramatically in recent years.

In July 2006 a popular media distribution website revealed that more than 100 million videos were being watched every day with 2.5 billion videos being watched during the month of June 2006. The website estimated that over 50,000 videos were being added per day in 2006 and that over 6.1 million videos and 50,000 user accounts were active in 2006. Furthermore, the website noted that the number of posted videos increased to over 60 million in less than twelve months during 2007.

Sometimes, a submitter posts media content that includes confidential information. Moreover, such confidential media may also include content for which the submitter does not have rights. For example, a confidential video of the submitter may have a copyrighted song as the audio background. Because the media includes confidential information, it may be problematic to inform a potential third party rights holder of the existence of confidential material posted by the submitter.

What are needed, therefore, are systems and/or methods to alleviate the aforementioned deficiencies.

BRIEF SUMMARY

Consistent with the principles of the present invention as embodied and broadly described herein, the present invention includes a media analysis system, a media fingerprint generation system, and a notification system. The media analysis system accepts a media file from a submitter. From this media file, the fingerprint generation system generates a fingerprint which is an electronic representation of the contents of the media file. The fingerprint matching system then analyzes the fingerprint generated by the media fingerprint generation system against fingerprint generated from existing material known to have intellectual property rights to determine if there is a match and therefore a potential media rights conflict.

The notification system informs the submitter of the results of the analysis before the submitted media file is allowed to be posted to an internet web hosting system. If the analysis reveals no potential matches then the submitter will be allowed to post the media file. However, if the analysis does reveal a potential match, the submitter will have the ability to modify the submitted media file to remove the possibly offending material.

In another embodiment, if the submitter is notified that the submitted media file contains possibly infringing material and the submitter fails to either remove the submitted media file or to modify the submitted media file to remove the possibly infringing material, the media analysis system automatically removes the submitted media file from a media database.

In another embodiment, if the submitter is notified that the submitted media file contains possibly infringing material and the submitter fails to either remove the submitted media file or to modify the submitted media file to remove the possibly infringing material, the notification system automatically notifies the third party rights holder and/or a service provider of the existence of a possibly infringing media file.

In another embodiment, a method for detecting a possible media rights conflict involves generating a fingerprint from a media file submitted by a submitter. The method analyzes the fingerprint against fingerprints of existing media files for the existence of matches indicating possible conflicts and notifies the submitter of the results of the analysis. The notification would indicate to the submitter areas of the media file which contain the matches.

The method would also accept a submission of a modified media file for further fingerprint analysis to allow the submitter the ability to submit a media file without matching material. However, the method would also permit the automatic removal of the submitted media file where the submitter has not withdrawn the submitted media file within a specified timeframe after notification of a match. In an alternate embodiment, the method includes notification to the submitter of the removal of the submitted media file, notifying a service provider of the removal of the submitted media file, and notifying a third party rights holder of the removal of the submitted media file.

In another embodiment, a system for detecting a possible media rights conflict involves a processor, and a memory in communication with the processor for storing a plurality of processing instructions for directing the processor to generate a fingerprint from a media file submitted by a submitter. The system would then analyze the fingerprint against fingerprints of existing media files for the existence of matches indicating a possible media rights conflict and notify the submitter of the results of the analysis. The system would have the ability to indicate to the submitter areas of the media file which contain the matches. The method would also accept submission of a modified media file for further fingerprint analysis in order to remove the matches. The system could also remove the submitted media file where the submitter has not withdrawn the submitted media file within a specified timeframe after notification of a possible media rights conflict and then notify the submitter of the removal of the submitted media file, notify a service provider of the removal of the submitted media file, and notify a third party rights holder of the removal of the submitted media file.

In this way, a submitter of a media file can insure that the media content sought to be uploaded to a media provider does not violate the rights of a third party rights holder whose media fingerprints are contained in the fingerprint database. This approach encourages a submitter to upload media files while protecting the rights of both the submitter and of currently known third party rights holders within the database.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION

The present invention relates to the detection and notification of possible media rights conflicts involving media files being sought to be uploaded to a media provider. In embodiments of this invention, the submitted media file is analyzed for possible media rights conflicts and the submitter is given the opportunity to remove any possibly infringing portion of the media file prior to posting the media file to the media provider or informing a third party rights holder of any possible media rights conflict.

While specific configurations, arrangements, and steps are discussed, it should be understood that this is done for illustrative purposes only. A person skilled in the pertinent art(s) will recognize that other configurations, arrangements, and steps may be used without departing from the spirit and scope of the present invention. It will be apparent to a person skilled in the pertinent art(s) that this invention may also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
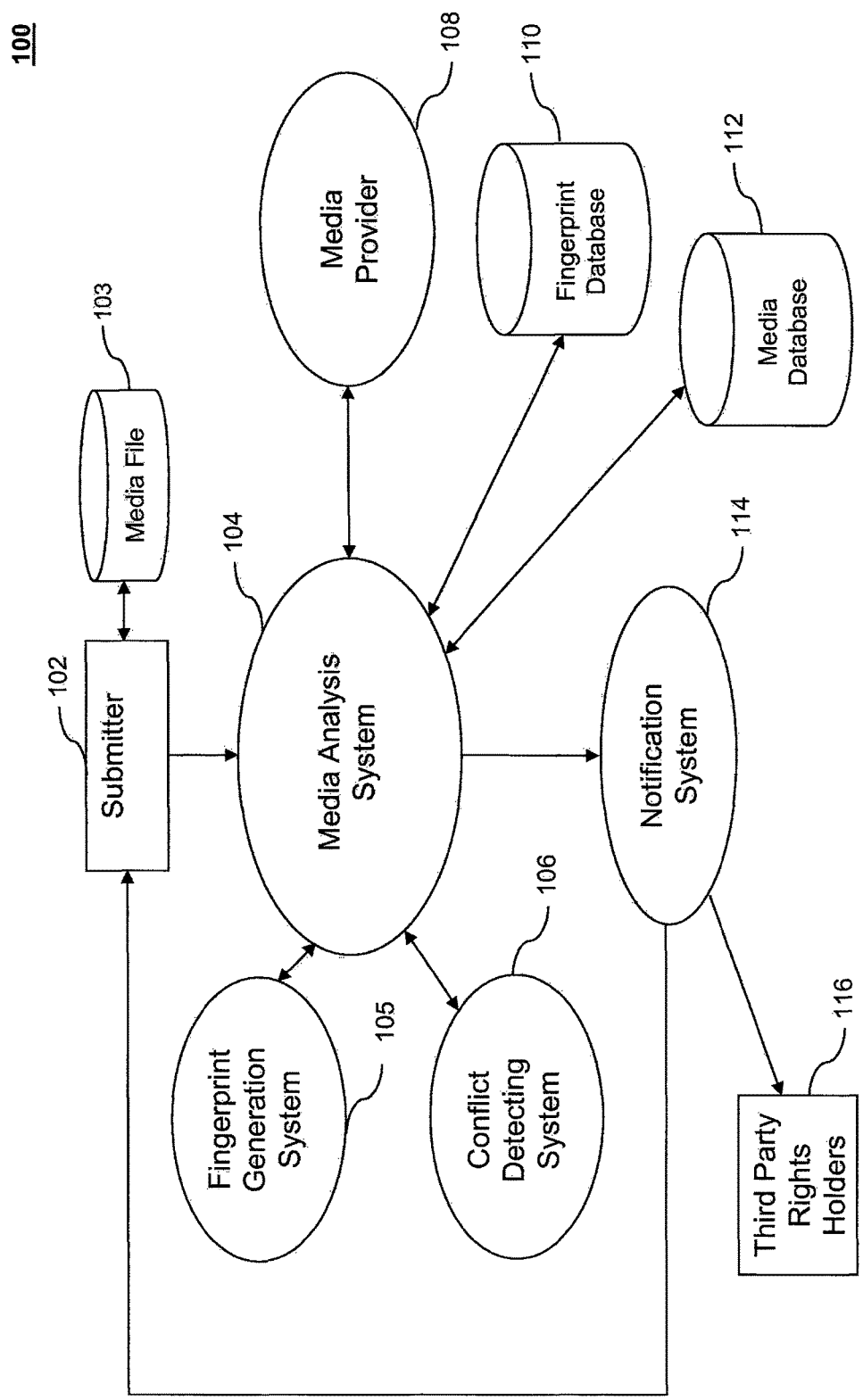
FIG. 1 is a system diagram depicting an implementation of a system for enforcing copyrights within media files, according to an embodiment of the invention.

FIG. 1 is an illustration of a system 100, according to an embodiment of the invention. Such a system allows for the detection and notification that a submitted media file uploaded to a media provider by a submitter may have material infringing the rights of others. System 100 contains a media analysis system 104, a fingerprint generation system 105, a conflict detecting system 106, and a notification system 114. The process is initiated when a submitter 102 decides to post some type of media file 103 via a network to a media provider 108 which typically hosts content for distribution and access by registered or unregistered users. However, a submitted media file may contain material to which another has rights and that has intentionally or unintentionally been included within the submitted media file. In order to protect the rights of this other rights holder, a profile of the submitted media file 103 is generated and analyzed by a media analysis system 104. In one embodiment, the conflict detecting system 106 is a media fingerprint generation system. This analysis is accomplished by having a media fingerprint generation system produce a digital profile or "fingerprint" of the submitted media file. The fingerprint is a digital representation of the submitted media file, or portion thereof, according to an embodiment of the invention. Generally, the fingerprint can be some function of the submitted media file, such that any two different media files are statistically unlikely to have identical fingerprints. The technology to produce a fingerprint from a media file is commercially available, e.g. from Guba Inc., of San Francisco, with a system designated as "Johnny," and from Philips Content Identification of Eindhoven, Netherlands, and well known to persons of ordinary skill in the relevant art.

Once a fingerprint is generated by the fingerprint generation system 105 from a submitted media file, the conflict detecting system 106 will compare the resultant fingerprint with fingerprints of known copyrighted material. The known fingerprints may be stored within the fingerprint database 110. A database, as referred to herein, can be a table, list, or any other collection or organization of information known to one of ordinary skill in the art, whether represented, for example, as a flat file or a set of relational tables, lists, or records. In one embodiment, a fingerprint may be created for various parts of the submitted media. For example, the soundtrack, or portion thereof, might be fingerprinted separately, the video might be fingerprinted separately, etc.

The conflict detecting system 106 compares the fingerprint associated with the submitted media file 103 with fingerprints that are contained within the fingerprint database 110.

If the conflict detecting system 106 does not find any match then the submitted media file may be accepted for storage within the media database 112 and subsequently allowed to post via a media provider 108. In this case the media analysis system 104, via the notification system 114, may inform the submitter of the results of the analysis in that the fingerprint of the submitted media file does not match any known fingerprints contained within the fingerprint database 110. Alternately, no such notification may be issued in an alternative embodiment.

However, if the conflict detecting system 106 determines that there is a match between the fingerprint of the submitted media file and one or more fingerprints of existing media files in the fingerprint database 110, then the notification system 114 will notify the submitter of the results of the analysis. A possible rights holder is not generally notified that a submitted media file contains a fingerprint match as the identity of a rights holder are not known for certain.

In another embodiment, conflict detecting system 106 is a system that reviews metatdata associated with the media file, such as its title, artist, length, etc.

In an embodiment of the invention, the notification system 114 would inform the submitter 102 which portions of the submitted media file 103 indicate a detected right conflict, including the nature of the match (e.g. video and/or audio).

Once the submitter 102 has been notified by the notification system 114 of a detected right conflict, the submitter 102, must somehow deal with the notification and has the option to withdraw the submitted media file 103 within a certain time frame. In addition, the submitter 102 may have the ability to re-submit a new modified media file for analysis. In this manner the submitter has the opportunity to remove or modify a media file without the third party rights holders 116 being notified of the possible media rights conflict.

In one embodiment, if the submitter 102 does not respond, within an allotted time frame, the media file 103 is automatically removed. In addition, any known third party rights holders may also be informed of the possible rights conflict by the media file, but would not be allowed to access the media file without specific authorization from the submitter.

Figure 2:
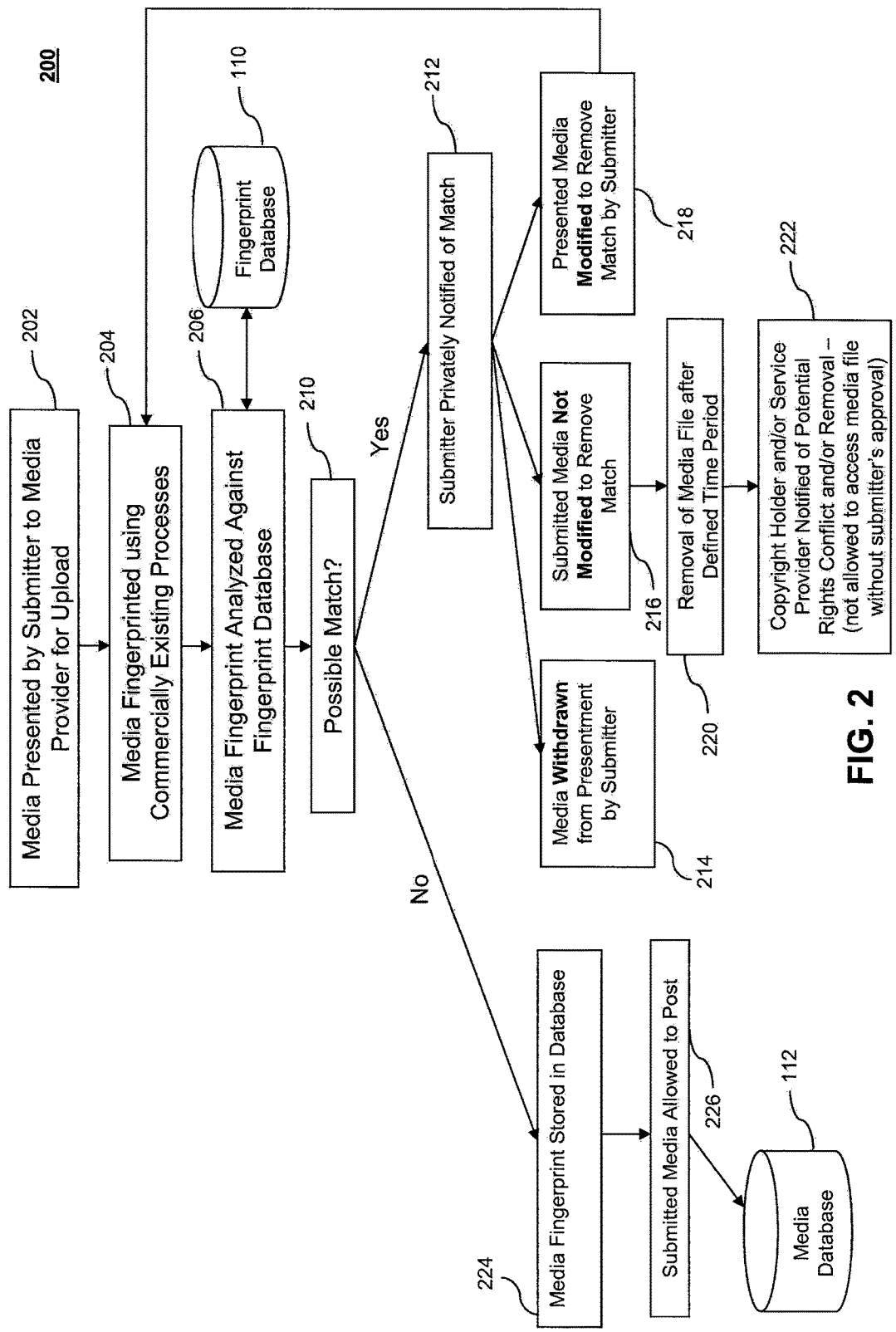
FIG. 2 is a flowchart depicting an implementation a system for enforcing copyrights within media files, according to an embodiment of the invention.

FIG. 2 is a flowchart of an operation 200 according to an embodiment of the invention in which a submitter presents a media file for uploading to a media provider where the system analyzes the submitted media file for possible media rights conflict. The operation starts with step 202 where a media file is submitted by a submitter for upload to a media provider. In step 204 the submitted media file is digitally fingerprinted which produces a fingerprint associated with the submitted media file. In step 206 the fingerprint is analyzed and compared to fingerprints of known media material in a fingerprint database 110. In step 210 a determination is made as to whether the submitted media file contains material that is considered a possible match with media associated with a third party rights holder.

If the analysis of the submitted media file results in the decision that there is no match with known fingerprints in the fingerprint database 110, then in step 224 the fingerprint of the submitted media file is stored in the fingerprint database 110, in one embodiment, and the submitted media file is stored in a media database 112 and forwarded to the media provider as being acceptable to post under step 226.

However, if the analysis of the submitted media file results in a match, or multiple matches, with one or more known fingerprints in the fingerprint database 110, then in step 212 the submitter is notified of the match. The notification is done prior to any type of notification to a possible third party rights holder in order to allow for the submitter to remove the matching material within the submitted media file. Notifying the submitter allows the submitter to rectify the potential problem without having the contents of the media file revealed to third parties.

In one embodiment, media files can be posted as "private" media files that can be viewed only by a predetermined group. In such as situation, it is preferable to notify the submitter of a potential rights conflict because the "private" file is not intended to be viewed outside of the predetermined group.

A match can be defined, as an example, where there is a submission of a media file containing, as an example, a 30 minute home video being filmed by the submitter of a two year old's birthday party where somewhere within the video, in the background, the recording captures 30 seconds of a copyrighted song being played from a compact disc. While the original home video would not otherwise represent a possible media rights conflict, the unauthorized reproduction of a portion of the song could be a media rights conflict. In the above case the system would notify the submitter of the match as well as where in the media file the match occurred, i.e. in the 30 second portion of the home video, and the type of match that was found, i.e., audio and video in the example of the motion picture and just audio in the example of the home video.

The submitter has three possible actions in response to a match. These actions are represented by steps 214, 216, and 218. In step 214 the submitter decides to withdraw the submitted media at which point the process terminates. However, the submitter may decide to modify the submitted media file. In step 218 the submitter modifies the submitted media file to remove the matching material. Then in step 204 a new fingerprint is generated from the modified media file. The modified media file in step 206 is then analyzed for possible matches in steps 206 and 210.

The third possibility, after notification that there is a match with the submitted media file, is where the submitter does not modify the submitted media file to remove the matching content under step 216 within a specified time period. In this situation, under step 220 the submitted media file is removed from the system after the expiration of the specified time period. In step 222 the known third party rights holders and service providers can be notified of the existence of the matching media file and its subsequent removal from the system. However, access to the submitted media file by a third party rights holder would not be granted unless the submitter specifically authorized such an action.

Figure 3:
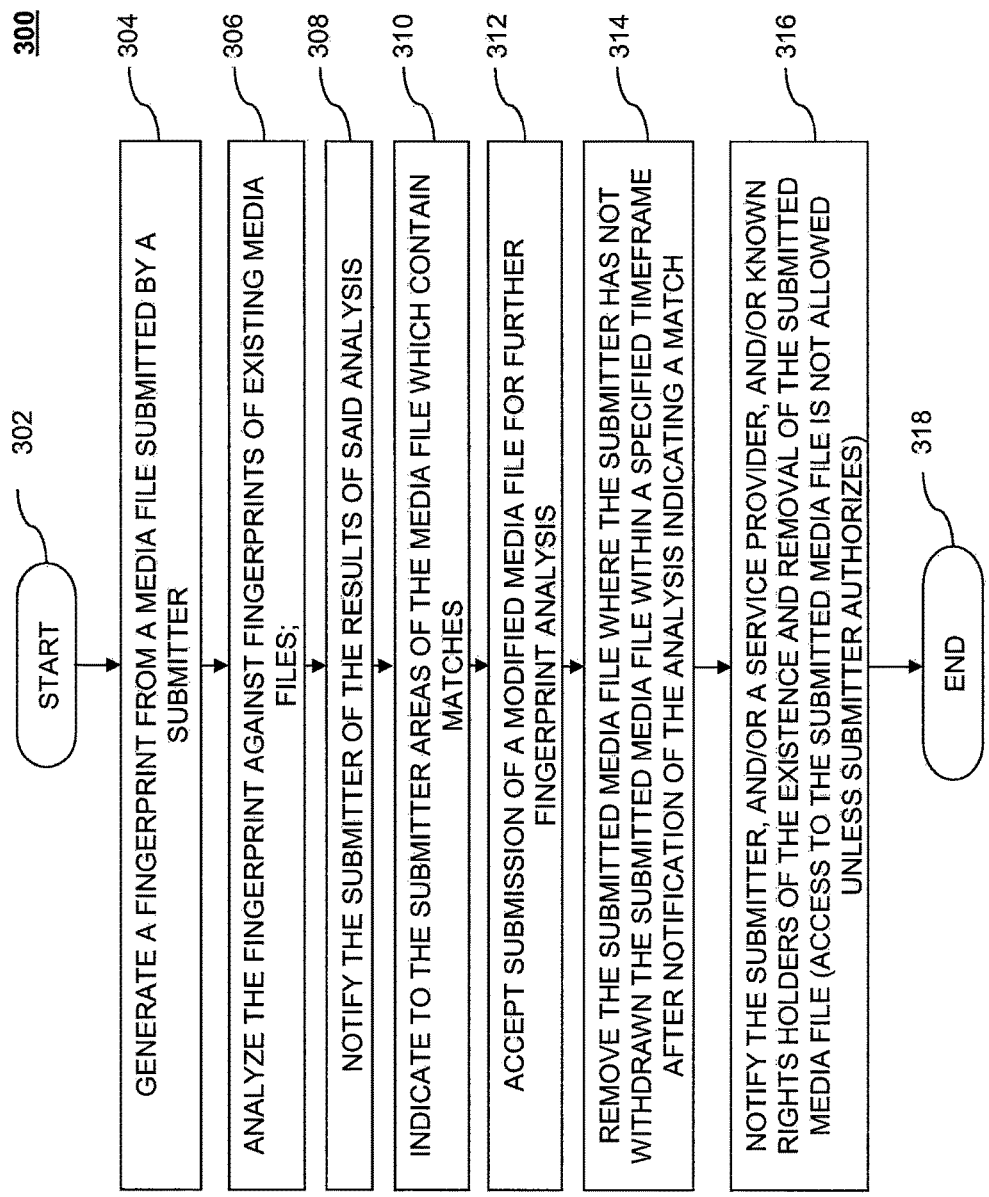
FIG. 3 is a flowchart depicting a method for enforcing copyrights within media files, according to an embodiment of the invention.

FIG. 3 is a flowchart depicting a method 300 for the detection of possible media rights conflict, according to an embodiment of the present invention. Method 300 begins at step 302. In step 304, a fingerprint is generated from a media file that has been submitted by a submitter to a media provider website for example. In step 306 the fingerprint generated in step 304 is analyzed against the fingerprints of existing media files in order to ascertain if the submitted media file contains any matches. In step 308 the submitter is notified of the results of the matching analysis of step 306. In step 310, if the analysis concludes that there are portions of the submitted media file which match existing fingerprinted content, then the details of which areas of the media file contain the matches are indicated to the submitter. Such details may include the location of the matches and the type and attributes of the matching media content. In step 312 the submitter is given the opportunity to submit a modified media file for further fingerprint matching analysis. In step 314 any submitted media file that contains matches which has not been withdrawn within a specified timeframe after notification may be automatically withdrawn. This is done if the submitter does not withdraw the submitted media file according to a set of specified criteria (e.g., within a certain time period) after being notified that the analysis indicated a match. In step 316, notification of the removal of the submitted media file is given to the submitter and optionally to any applicable service providers and known rights holders. However, access to the submitted media file is not allowed unless the submitter specifically authorizes such action. Method 300 ends at step 318.

The processes of FIGS. 2 and 3 can be implemented in software, firmware, or hardware, or using any combination thereof. If programmable logic is used, such logic can execute on a commercially available processing platform or a special purpose device.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
    a processor; and
    a memory communicatively coupled to the processor, the memory having stored therein computer-executable instructions which when executed by the processor cause the processor to perform operations comprising:
        receiving a media file submitted by a submitter as part of an upload process;
        generating a fingerprint for the media file;
        comparing the generated fingerprint to a plurality of stored fingerprints;
        determining that the media file has a potential media rights conflict with a third party rights holder based on the generated fingerprint matching a fingerprint from the plurality of stored fingerprints;
        responsive to determining that the media file has the potential media rights conflict, sending a notification to the submitter prior to notifying the third party rights holder of the potential media rights conflict, the notification indicating that the media file has the potential media rights conflict, wherein the notification comprises identification of a respective location of the potential media rights conflict in the media file and respective types of matches of the potential media rights conflict in the media file, wherein the respective types of matches are indicative of one of audio only, video only, or audio and video;
        responsive to sending the notification to the submitter and prior to notifying the third party rights holder of the potential media rights conflict, providing the submitter an opportunity to submit a modified version of the media file or to withdraw the media file;
        responsive to determining that the submitter submitted the modified version of the media file and prior to notifying the third party rights holder of the potential media rights conflict, determining whether the potential media rights conflict indicated in the notification is present in the modified version of the media file;
        responsive to determining that the potential media rights conflict is not present in the modified version of the media file and prior to notifying the third party rights holder of the potential media rights conflict, accepting the modified version of the media file for storage within a media database;
        responsive to determining that the submitter did not submit the modified version of the media file or withdraw the media file within a time period of sending the notification, removing the media file from the upload process;
        responsive to removing the media file from the upload process, notifying the third party rights holder of the potential media rights conflict and removal of the media file;
        receiving, from the third party rights holder, a request for access to the media file; and
        responsive to the submitter not authorizing access of the media file to the third party rights holder, denying the request.

2. The system of claim 1, wherein the computer-executable instructions, when executed by the processor, further cause the processor to perform operations comprising:
    storing media files having associated media rights; and
    generating the plurality of stored fingerprints for the media files.

3. The system of claim 1, wherein the computer-executable instructions, when executed by the processor, further cause the processor to perform operations comprising:
    responsive to the submitter authorizing access of the media file to the third party rights holder, providing the third party rights holder access to the media file.

4. A method, comprising:
    receiving, by a device including a processor, a media file submitted by a submitter as part of an upload process;
    generating, by the device, a fingerprint for the media file;
    comparing, by the device, the generated fingerprint to a plurality of stored fingerprints;
    determining, by the device, that the media file has a potential media rights conflict with a third party rights holder based on the generated fingerprint matching a fingerprint from the plurality of stored fingerprints;
    responsive to determining that the media file has the potential media rights conflict, sending, by the device, a notification to the submitter prior to notifying the third party rights holder of the potential media rights conflict, the notification indicating that the media file has the potential media rights conflict, wherein the notification comprises identification of a respective location of the potential media rights conflict in the media file and respective types of matches of the potential media rights conflict in the media file, wherein the respective types of matches are indicative of one of audio only, video only, or audio and video;
    responsive to sending the notification to the submitter and prior to notifying the third party rights holder of the potential media rights conflict, providing the submitter an opportunity to submit a modified version of the media file or to withdraw the media file;
    responsive to determining that the submitter submitted the modified version of the media file and prior to notifying the third party rights holder of the potential media rights conflict, determining whether the potential media rights conflict indicated in the notification is present in the modified version of the media file;
    responsive to determining that the potential media rights conflict is not present in the modified version of the media file and prior to notifying the third party rights holder of the potential media rights conflict, accepting the modified version of the media file for storage within a media database;
    responsive to determining that the submitter did not submit the modified version of the media file or withdraw the media file within a time period of sending the notification, removing the media file from the upload process;

responsive to removing the media file from the upload process, notifying the third party rights holder of the potential media rights conflict and removal of the media file;

receiving, from the third party rights holder, a request for access to the media file; and responsive to the submitter not authorizing access of the media file to the third party rights holder, denying the request.

5. A non-transitory computer-readable medium having instructions stored thereon that, in response to execution, cause a system including a processor to perform operations comprising:

receiving a media file submitted by a submitter as part of an upload process;

generating a fingerprint for the media file;

comparing the generated fingerprint to a plurality of stored fingerprints;

determining that the media file has a potential media rights conflict with a third party rights holder based on the generated fingerprint matching a fingerprint from the plurality of stored fingerprints;

responsive to determining that the media file has the potential media rights conflict, sending a notification to the submitter prior to notifying the third party rights holder of the potential media rights conflict, the notification indicating that the media file has the potential media rights conflict, wherein the notification comprises identification of a respective location of the potential media rights conflict in the media file and respective types of matches of the potential media rights conflict in the media file, wherein the respective types of matches are indicative of one of audio only, video only, or audio and video;

responsive to sending the notification to the submitter and prior to notifying the third party rights holder of the potential media rights conflict, providing the submitter an opportunity to submit a modified version of the media file or to withdraw the media file;

responsive to determining that the submitter submitted the modified version of the media file and prior to notifying the third party rights holder of the potential media rights conflict, determining whether the potential media rights conflict indicated in the notification is present in the modified version of the media file;

responsive to determining that the potential media rights conflict is not present in the modified version of the media file and prior to notifying the third party rights holder of the potential media rights conflict, accepting the modified version of the media file for storage within a media database;

responsive to determining that the submitter did not submit the modified version of the media file or withdraw the media file within a time period of sending the notification, removing the media file from the upload process;

responsive to removing the media file from the upload process, notifying the third party rights holder of the potential media rights conflict and removal of the media file;

receiving, from the third party rights holder, a request for access to the media file; and responsive to the submitter not authorizing access of the media file to the third party rights holder, denying the request.

6. A system comprising:

means for receiving a media file submitted by a submitter as part of an upload process;

means for generating a fingerprint for the media file;

means for comparing the generated fingerprint to a plurality of stored fingerprints;

means for determining that the media file has a potential media rights conflict with a third party rights holder based on the generated fingerprint matching a fingerprint from the plurality of stored fingerprints;

means for responsive to determining that the media file has the potential media rights conflict, sending a notification to the submitter prior to notifying the third party rights holder of the potential media rights conflict, the notification indicating that the media file has the potential media rights conflict, wherein the notification comprises identification of a respective location of the potential media rights conflict in the media file and respective types of matches of the potential media rights conflict in the media file, wherein the respective types of matches are indicative of one of audio only, video only, or audio and video;

means for responsive to sending the notification to the submitter and prior to notifying the third party rights holder of the potential media rights conflict, providing the submitter an opportunity to submit a modified version of the media file or to withdraw the media file;

means for responsive to determining that the submitter submitted the modified version of the media file and prior to notifying the third party rights holder of the potential media rights conflict, determining whether the potential media rights conflict indicated in the notification is present in the modified version of the media file;

means for responsive to determining that the potential media rights conflict is not present in the modified version of the media file and prior to notifying the third party rights holder of the potential media rights conflict, accepting the modified version of the media file for storage within a media database;

means for responsive to determining that the submitter did not submit the modified version of the media file or withdraw the media file within a time period of sending the notification, removing the media file from the upload process;

means for responsive to removing the media file from the upload process, notifying the third party rights holder of the potential media rights conflict and removal of the media file;

means for receiving, from the third party rights holder, a request for access to the media file; and responsive to the submitter not authorizing access of the media file to the third party rights holder, denying the request.

* * * * *